VALVE STRUCTURE FOR CONTROLLING DISCHARGE OF WASTE LIQUID INTO PNEUMATIC SEWAGE DISPOSAL SYSTEM
Original Filed July 15, 1970 2 Sheets-Sheet 1
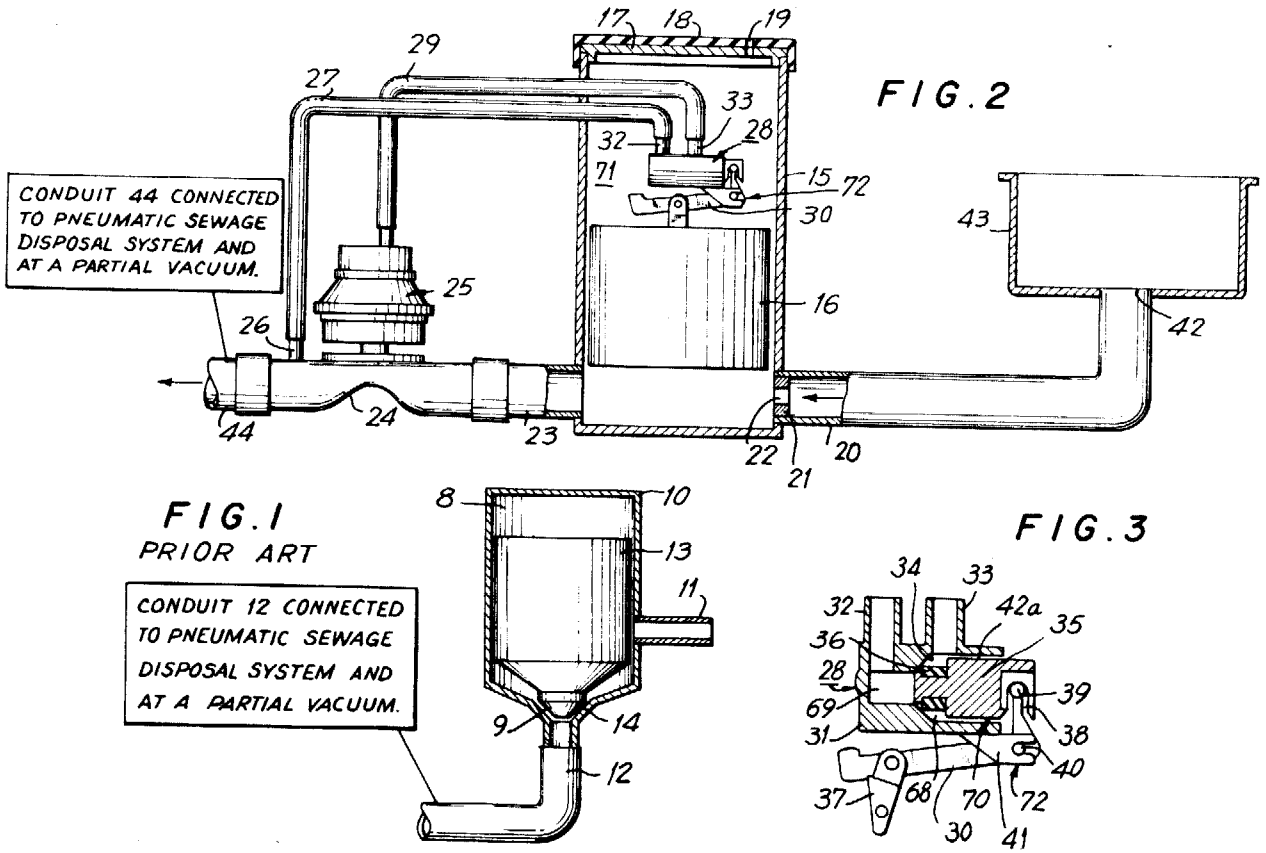

United States Patent Office

Re. 28,008
Reissued May 14, 1974

28,008

VALVE STRUCTURE FOR CONTROLLING DISCHARGE OF WASTE LIQUID INTO PNEUMATIC SEWAGE DISPOSAL SYSTEM

Sven Algot Joel Liljendahl, Kallhall, Sweden, assignor to Aktiebolaget Electrolux, Stockholm, Sweden Original No. 3,628,194, dated Dec. 21, 1971, Ser. No. 54,927, July 15, 1970. Application for reissue Apr. 9, 1973, Ser. No. 349,428
Claims priority, application Sweden, Sept. 8, 1969, 12,366/69
Int. Cl. E03d *1/00, 5/00, 3/00*
U.S. Cl. 4—10 21 Claims

Matter enclosed in heavy brackets [ ] appears in the original patent but forms no part of this reissue specification; matter printed in italics indicates the additions made by reissue.

ABSTRACT OF THE DISCLOSURE

Waste liquid is discharged into a pneumatic sewage disposal system through a discharge conduit from the outlet of a place in a kitchen or laundry or a fixture in a bathroom like a bathtub or washbasin, for example. Flow control structure is operatively associated with the discharge conduit which opens when liquid starts to flow from the outlet and closes when the flow of liquid stops.

BACKGROUND OF THE INVENTION

1. Field of the invention

In a pneumatic sewage disposal system provision must be made for controlling the discharge into such a sewage system of waste liquid flowing from places in kitchens and laundries and fixtures in bathrooms like bathtubs and washbasins, for example.

2. Description of the prior art

FIG. 1 illustrates valve mechanism of a known type for use in a pneumatic sewage disposal system for controlling the discharge of waste liquid into the sewage system repsonsive to flow of such liquid. Waste liquid. flows through a conduit 11 from a place in a kitchen or laundry or a fixture in a bathroom like a bathtub or washbasin, for example. The waste liquid flows from the conduit 11 to a vessel 10 and from the latter to a discharge conduit 12 which is adapted to be connected to a pneumatic sewage disposal system and maintained at a partial vacuum or subatmospheric pressure.

The bottom of the vessel 10 is formed to provide a seat 14 for a valve 9 which depends downward from the bottom of a float 13 which is vertically movable within the vessel 10 which serves as a float chamber 8. The valve 9 moves toward and from its seat 14 with vertical movement of the float 13 in chamber 8 responsive to rise and fall therein of waste liquid flowing through the conduit 11.

When the quantity of waste liquid in the float chamber 8 is sufficient, the float 13 will rise and move the valve 9 from its seat 14. When this occurs waste liquid will be withdrawn through discharge conduit 12 into the pneumatic sewage system responsive to subatmospheric pressure in the conduit 12. When the liquid level in the float chamber 8 falls sufficiently the float 13 will move downward and the valve 9 in turn will be moved downward to its closed position against the seat 14.

The valve mechanism in FIG. 1 functions in such manner that the valve 9 will be moved to its closed position before all of the waste liquid in the float chamber 8 has been discharged therefrom. This is objectionable because the waste liquid in the float chamber 8 and conduit 11 leading thereto often develops an unpleasant odor. When grease, soap, detergent and similar materials are present in waste liquid, such materials and their reaction products tend to collect on the surfaces of the float 13 and interior of the chamber 8. This will cause the float 13 to operate sluggishly. Further, the accumulation of objectionable material in this way eventually can cause the float-operated valve 9 to malfunction for the reason that the float 13 cannot move freely in its chamber.

SUMMARY OF THE INVENTION

My invention relates to controlling the discharge of waste liquid from places in kitchens and laundries and fixtures in bathrooms like bathtubs and washbasins, for example, into a pneumatic sewage disposal system by improved valve structure which opens automatically when flow of waste liquid starts and automatically closes only when the flow of waste liquid stops and all of the liquid has been discharged into the sewage disposal system.

I accomplish this by providing in a discharge conduit, which is adapted to be maintained at a partial vacuum and through which waste liquid from the outlet of such a place is discharged into a pneumatic sewage disposal system, a main valve and operating means therefor which opens the main valve responsive to a partial vacuum and closes the main valve responsive to atmospheric pressure.

The discharge conduit includes a vessel defining a float chamber in which a float is movable up and down with rise and fall of liquid therein. The main valve operating means is connected to a region of the discharge conduit downstream from the main valve by a control valve when it is moved to one of its two operating positions responsive to upward movement of the float. The main valve operating means is connected to the float chamber by the control valve when it is moved to the other of its two positions responsive to downward movement of the float.

An important feature of my invention is that, when flow of waste liquid starts in the discharge conduit, the float-operated control valve is activated by a small quantity of waste liquid flowing into the float chamber and is moved to the one of its two operating positions. When the control valve is activated in this manner, the main valve operating means is connected to the discharge conduit and the main valve operating means become operable to open the main valve responsive to the partial vacuum prevailing in the discharge conduit.

When this occurs the liquid in the float chamber is sucked out very quickly and the float moves down to its lowest position, thereby causing the control valve to move to the other of its two positions. Since the main valve previously has been opened, the float chamber will be in communication with that part of the discharge conduit in which a partial vacuum is adapted to be maintained, so that a partial vacuum also will prevail in the float chamber. The partial vacuum prevailing in the float chamber will be transmitted to the main valve operating means when the control valve moves to the other of its two positions responsive to movement of the float to its lowest position in the float chamber.

Although the partial vacuum prevailing in the float chamber is less than the partial vacuum in the discharge conduit which is relied upon to cause the main valve operating means to open the main valve, nevertheless it is sufficient to render the main valve operating means operable to keep the main valve open while waste liquid flows from the outlet to the float chamber. The passageway in which waste liquid flows from the outlet to the float chamber is so constructed and formed that the waste liquid will function to block flow of ambient air at atmospheric pressure from the outlet to the float chamber so that the latter will be maintained at a partial vacuum.

When the flow of waste liquid from the outlet to the float chamber stops, ambient air at atmospheric pressure flows into the float chamber, and, by reason of the fact that the float chamber is connected to the main valve operating means, the latter will be rendered operable to close the main valve after practically all of the waste liquid has been discharged into the pneumatic sewage disposal system.

BRIEF DESCRIPTION OF THE DRAWING

In the drawing, FIG. 1, is a vertical sectional view more or less diagrammatically illustrating valve mechanism of a known type intended for use in a pneumatic sewage disposal system for controlling the discharge of waste liquid into the sewage system responsive to flow of such waste liquid;

FIG. 2 is an elevation view, partly in section, of valve structure which embodies the invention for controlling the discharge of waste liquid into a pneumatic sewage disposal system responsive to flow of such waste liquid.

FIG. 3 is an enlarged fragmentary sectional view of the float-operated valve mechanism shown in FIG. 2;

DESCRIPTION OF THE PREFERRED EMBODIMENT

Figure 4:
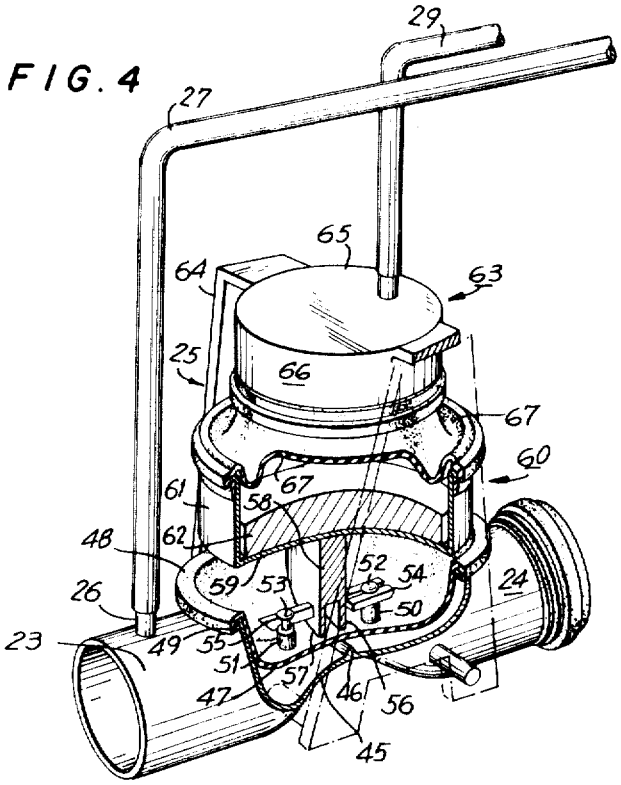
FIG. 4 is an enlarged perspective view, partly in section, of the pneumatically-operated valve mechanism shown in FIG. 2 which coacts with the float-operated valve mechanism.

In FIG. 2 I have shown my invention embodied in a pneumatic sewage disposal system for controlling the discharge of waste liquid into the sewage system responsive to flow of such liquid. Waste liquid flows through a conduit 20 from the outlet 42 of a place 43 in a kitchen or laundry or a fixture in a bathroom like a bathtub or washbasin, for example. The waste liquid flows from the conduit 20 into a discharge conduit 23 which is in communication with a conduit 44 adapted to be connected to a pneumatic sewage disposal system and maintained at a partial vacuum which may be one-half of atmospheric pressure, for example.

Flow control structure is operatively associated with the discharge conduit 23 which opens when liquid starts to flow from the outlet 42 and closes when such flow of liquid stops. The flow control structure includes a main valve 24 coupled in the discharge conduit 23 at a region downstream from and in communication with the outlet 42. As seen in FIG. 4, the valve 24 is embodied in a section of the discharge conduit 23 having an oval-shaped opening in the top thereof and an inverted U-shaped bottom 45 at the region of such top opening. A ridge 46, which is transverse to the longitudinal axis of the conduit 23, extends inward therefrom about the conduit between the opposing edges of the top opening.

An elastic wall 47 of the shape shown in FIG. 4 is positioned at the top opening of the conduit 23. The elastic wall, which may be formed of rubber, for example, is provided with a flange 48 which fits in an airtight manner over an outwardly bent edge 49 about the top opening in the conduit 23. The elastic wall 47 serves as a valve member of the valve 24 and is movable between closed and open positions to control the discharge of waste liquid from the discharge conduit 23 into the conduit 44 forming a part of the pneumatic sewage disposal system.

Figure 5:
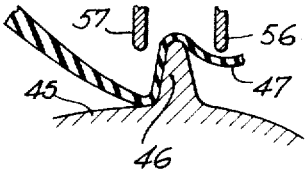
FIG. 5 is an enlarged fragmentary sectional view of parts shown in FIG. 4 to illustrate details more clearly.

A device 25 is provided to operate the main valve 24 and move the elastic valve member 47 between its closed and open positions. In FIG. 4 it will be seen that the elastic valve member 47 is formed with bosses 50 and 51 in which lifting buttons 52 and 53 are vulcanized. The buttons 52 and 53 coact with pairs of spaced horizontal bars 54 and 55 which are fixed to and project from two arms 56 and 57 of the operating device 25. The arms 56 and 57 have bottom edges of semicircular form which, along their entire lengths, can engage the elastic valve member 47 and press the latter into sealing engagement with the bottom 45 of the conduit 23 at opposing sides of the ridge 46, as shown in FIG. 5.

The arms 56 and 57 are formed at the periphery of a plate 58 which depends downward from and is fixed to the bottom 59 of an upright cylindrical-shaped vessel 60 having a sidewall 61 and in which a metal weight 62 is positioned. Another inverted U-shaped vessel 63 is disposed above and spaced from the vessel 60.

The vessel 63 is supported in a fixed position in any suitable manner, as by a frame 64, for example, and includes top 65 and a sidewall 66 extending downward therefrom. The bottom edge of the sidewall 66 of vessel 63 and top edge of the sidewall 61 of the vessel 60 are connected by a member 67 of annular shape which is formed of a suitable resilient material like rubber, for example. The annular-shaped member 67 is secured to the sidewall 61 and 66 in an airtight manner.

When the operating device 25 is connected to a region at a partial vacuum in a manner that will be explained presently, the vessel 60 wil move upward with respect to vessel 63 due to the resilient connection 67 therebetween. When this occurs the plate 58 and arms 56 and 57 will be moved upward and lift the buttons 52 and 53, thereby lifting the elastic valve member 47 from its closed or seated position in the conduit 23.

Conversely, when the operating device 25 is connected to a region at a higher pressure, such as atmospheric pressure, in a manner that will be explained presently, the vessel 60, with the aid of the weight 62, will move downward with respect to the vessel 63 due to the resilient connection between the vessels. When this occurs the plate 58 will be moved downward and the arms 56 and 57 will exert force against the elastic valve member 47 and move it firmly against the bottom 45 of the conduit 23 at opposing sides of the ridge 46.

The main valve 24 and operating device 25 just described are generally like those described in my U.S. Pat. No. 3,482,267, granted Dec. 9, 1969. The disclosure in my aforementioned patent may be considered as being incorporated in this application, and, if desired, reference may be made thereto for a detailed description of the main valve 24 and operating device 25.

The operating device 25 is connected by a conduit section 29, a control valve 28 and a conduit 27 to a region 26 of the discharge conduit 23 which is at a partial vacuum and downstream from the main valve 24. In a manner that will be described presently, the operating device 25 is connected by conduit section 29 and passageway means formed in the control valve 28 to a chamber 71 and will be influenced by the pressure prevailing in the latter which may be at a partial vacuum or at atmospheric pressure.

As seen in FIG. 3 the control valve 28 comprises a hollow body 31 having a chamber 68 communicating with a passageway 69. The conduit section 29 is connected by a nipple 33 to the chamber 68 and the conduit section 27 is connected by a nipple 32 to the pasageway 69. A valve member 70 comprising a cylindrical-shaped part 35 having a resilient sleeve or bushing 36 thereon is axially movable within the chamber 68. A wall of the chamber 68 serves as a seat 34 against which the bushing 36 bears when the valve 28 is in its illustrated closed position which may be referred to as the "other" of the two operating positions of the valve 28.

The valve member 70 is movable toward the right in FIG. 3 to its open position which may be referred to as "one" of the two operating positions of the valve 28. In such open position the bushing 36 is moved from its seat 34 and the conduit sections 29 and 27 are in communication with one another through the chamber 68 and passageway 69 in the hollow body 31. As seen in FIG. 3, the cylindrical-shaped member 35 is formed with an axially extending groove 42 at its periphery which provides a passageway from the chamber 68 within the hollow body 31 into the chamber 71 in which the control valve 28 is disposed.

In view of the foregoing, it will now be understood that when the valve member 70 of the control valve 28 is open and in "one" of its two operating positions with the bushing 36 moved from its seat 34, the conduit sections 27 and 29 and connection therebetween, which is formed by the chamber 68 and passageway 69 in the valve body 31, constitute means for connecting the operating device 25 of the main valve 24 to the region 26 of the discharge conduit 23 which is at a partial vacuum. When this occurs the elastic valve member 47 of the main valve 24 moves to its open position, as previously explained.

When the valve member 70 of the control valve 28 is closed and in the "other" of its two operating positions, the operating device 25 of the main valve 24 is disconnected from the region 26 of the discharge conduit 23. Under these conditions the operating device 25 of the main valve 24 is connected to the chamber 71 and influenced by the pressure prevailing therein which may be partial vacuum or atmospheric pressure, as will be explained hereinafter. This connection includes the conduit section 29, chamber 68 of the valve body 31 and the groove 42 in the cylindrical-shaped member 35.

In accordance with my invention I provide sensing means in the discharge conduit 23 between the outlet 42 and the main valve 24 which functions when waste liquid starts to flow from the outlet 42 to move the control valve 28 to its open position or "one" of its two operating positions and render the operating device 25 operable to open the main valve.

In my preferred embodiment the discharge conduit 23 includes a vessel 15 between the main valve 24 and the outlet 42 which defines the chamber 71 and the sensing means comprises a float 16 in the chamber 71 which is operatively connected by mechanism 72 to the control valve 28. The mechanism 72 includes a vertically disposed link 37 having its lower end pivotally connected to the top of the float 16 in any suitable manner (not shown). The upper end of the link 37 is pivotally connected to a horizontally extending arm of an L-shaped lever 30 at a region intermediate its ends. The lever 30 at the bend thereof is provided with a pin 40 which is journaled in an opening of a stationary plate 41 mounted on the hollow body 31 of the control valve 28.

The outer end of the cylindrical-shaped part 35 of the valve member 70 is formed with a recess 38 which receives the upper end 39 of the vertically disposed arm of the L-shaped lever 30. The mechanism 72 just described functions in such manner that the part 35 moves to the left in FIG. 3 toward the closed position or the "other" operating position of the valve 28 responsive to downward movement of the float 16. Conversely, the part 35 moves to the right in FIG. 3 to the open position or the "one" operating position of the valve 28 responsive to upward movement of the float 16.

As seen in FIG. 2, the control valve 28 is disposed within the vessel 15 which has a removable top 17 and an overlying sealing cover 18 therefor which is formed of rubber, for example. The top 17 and sealing cover 18 are formed with aligned openings to provide a vent 19 for the chamber 71.

A disk 21 is provided at the region waste liquid flows from the conduit 20 into the float chamber 71. The disk 21, which is formed with an opening 22, serves as a flow-reducing member past which waste liquid flows from the outlet 42 to the float chamber 71. The opening 22 in the disk 21 preferably is of such size that the quantity of liquid flowing from the outlet 42 to the chamber 71 in a given interval of time never exceeds the quantity of liquid sucked and withdrawn from the chamber 71 in the same given interval of time and discharged into the sewage disposal system by the partial vacuum prevailing in the discharge conduit 23.

When the main valve 24 and control valve 28 are both closed, the float 16 will be in its lowest position in the chamber 71. Under these conditions the body of air in the chamber 71 will be at atmospheric pressure by reason of the vent 19 provided at the top of the vessel 15 and the fact that ambient air at atmospheric pressure can pass into the bottom of chamber 71 through the conduit 20 and from the place 43. Since the valve member 70 is closed, a passageway for air at atmospheric pressure is established from the chamber 71 to the operating device 25 which includes the groove 42 in the cylindrical-shaped part 35, chamber 68 in the valve body 31 and conduit section 29. For this reason the main valve 24 is closed in the manner previously explained.

When the main valve 24 is closed a partial vacuum prevails at region 26 of the discharge conduit 23 which is downstream from the main valve 24. With the valve member 70 of control valve 28 in its closed position, conduit section 27 will not be in communication with the conduit section 29 and a partial vacuum will prevail only in the conduit section 27.

Let us now assume that waste liquid starts to flow from the outlet 42 of the place 43 through the conduit 20 into the float chamber 71. In a short interval of time with a relatively little rise in liquid level in the chamber 71, the liquid level will rise sufficiently to lift the float 16 and render the latter operable to effect opening of the control valve 28. Air in the chamber 71 will be vented therefrom through the vent 19 with upward movement of the float 16. This will cause the valve member 70 to move to the right in FIG. 3 and connect conduit sections 27 and 29. When this occurs the operating device 25 will be connected to the region 26 at a partial vacuum through the conduit section 27, passageway 69 and chamber 68 in the valve body and the conduit section 29, whereby the main valve 24 will open in the manner previously explained.

When the main valve 24 opens the partial vacuum prevailing in the discharge conduit 23 immediately becomes effective to suck and withdraw waste liquid from the chamber 71, thereby effecting movement of the float 16 to its lowest position and closing the control valve 28. By dimensioning the opening 22 in the disk 21 to effect flow control of waste liquid in the manner explained above, the liquid flowing into the float chamber 71 will be continuously sucked out through the discharge conduit 23 and only an insignificant quantity of waste liquid will remain in the bottom of the float chamber 71. Hence, the float 16 will remain in its lowest position and control valve 28 will be closed during the entire time that waste liquid is being withdrawn from the float chamber 71 by the partial vacuum in the conduit 23.

The apertured flow-reducing member 21 also functions to prevent the pressure in the float chamber 71 from materially increasing and becoming equalized with the atmospheric pressure of ambient air enveloping the vessel 15 during removal of waste liquid from the chamber 71. Stated another way, the apertured disk 21 is so constructed and formed that waste liquid flowing from the outlet 42 to the float chamber 71 will block the flow of ambient air at atmospheric pressure therethrough sufficiently so that the partial vacuum prevailing in the conduit 24 will also mainly prevail in the float chamber 71. This operating condition is established even though the float chamber 71 has the vent 19 which provides a restricted passageway for ambient air at atmospheric pressure into the float chamber.

Hence, even after the float 16 falls to its lowest level in the chamber 71 and the valve member 70 of the control valve 28 moves against its seat to disconnect conduit section 29 from conduit section 27, the partial vacuum prevailing in the chamber 71 will function to render the operating means 25 operable to keep main valve 24 open.

Under these conditions the partial vacuum in the chamber 71 will be transmitted to the main valve operating means 25 through a connection formed by the groove 42 in the cylindrical-shaped part 35, chamber 68 in the valve body 31 and the conduit section 29. Hence, the main valve 24 will remain open during the entire time that waste liquid from the outlet 42 is being sucked through the discharge conduit 23 into the sewage disposal system. And, in view of the explanation just given, waste liquid will continue to be sucked out through discharge conduit 23 while the main valve 24 is open and the control valve 28 is closed due to the float 16 being in its lowest position in the chamber 71.

The main valve 24 will close only after all of the waste liquid has been sucked out of the chamber 71. When all of the waste liquid has been discharged from the place 43 and the conduit 20 is empty, ambient air at atmospheric pressure can then pass from the place 43 through conduit 20 into the chamber 71. Under these conditions the ambient air entering the chamber 71 will increase the pressure therein to such an extent that the partial vacuum in the chamber and transmitted through conduit section 29 to the device 25 will be insufficient for the latter to keep the main valve 24 open. When the main valve 24 now is closed there will be practically no waste liquid remaining in the conduit 20 and the float chamber 71.

When both the main valve 24 and control valve 28 are closed and the control valve 28 opens with upward movement of the float 16 responsive to waste liquid flowing into the float chamber 71, the partial vacuum transmitted from the region 26 of the discharge conduit 23 to the operating device 25 is of sufficient magnitude to lift the elastic valve 47 from its closed to its open position. After the elastic valve 47 is in its open position, the partial vacuum necessary to keep it open is considerably less than that required to move it to its open position. Hence, after the control valve 28 closes with movement of the float 16 to its lowest position, the main valve 24 will remain open to suck out all of the waste liquid from the float chamber 71 in the manner explained above because the partial vacuum that is maintained in the float chamber, although it is less than the partial vacuum prevailing in the region 26 of the discharge conduit 23 when the elastic valve 47 is moved to its open position, is nevertheless sufficient and adequate to keep the elastic valve 47 open until all of the waste liquid has been discharged from the chamber 71 and conduit 20. When this occurs ambient air at atmospheric pressure can then pass from the place 43 through conduit 20 into the float chamber 71, as just explained, whereby the pressure in the float chamber will increase and cause the operating device 25 to close the main valve 24.

I claim:

1. The combination with a pneumatic sewage disposal system, of (a) a discharge conduit which is adapted to be maintained at a partial vacuum and through which waste liquid is discharged into the sewage disposal system from a place having an outlet, (b) flow control structure operatively associated with said discharge conduit which opens when liquid starts flowing from the outlet and closes when such flow of liquid stops, (c) said flow control structure comprising a main valve coupled in said discharge conduit at a region thereof downstream from and in communication with the outlet, (d) operating means for opening said main valve responsive to a partial vacuum and for closing said main valve responsive to atmospheric pressure, (e) said discharge conduit including a vessel which is disposed between said main valve and the outlet, said vessel defining a float chamber, (f) a float movable up and down in said float chamber responsive to rise and fall, respectively, of liquid therein, (g) a control valve having two operating positions, (h) means including said control valve in one of its operating positions for connecting said main valve operating means to a region of said discharge conduit downstream from said main valve, (i) means including said control valve in the other of its operating positions for connecting said main valve operating means to said float chamber, (j) means for moving said control valve to its one and other operating positions responsive to up and down movement, respectively, of said float, and (k) said flow control structure being so constructed and formed that said float chamber is maintained at a partial vacuum when waste liquid flows from the outlet and at atmospheric pressure when the flow of waste liquid from the outlet stops.

2. Apparatus as set forth in claim 1 in which said flow control structure is so constructed and formed that waste liquid flowing from the outlet to said float chamber functions to block flow of ambient air at atmospheric pressure from the outlet to said float chamber.

3. Apparatus as set forth in claim 1 which includes an apertured member past which liquid flows from the outlet of the place to said float chamber, said apertured member being so constructed and formed that the rate at which liquid flows in a given interval of time from the outlet to said float chamber will never exceed the rate at which liquid is withdrawn from said float chamber in said given interval of time responsive to partial vacuum in said discharge conduit.

4. Apparatus as set forth in claim 1 in which said control valve is disposed in said float chamber.

5. Apparatus as set forth in claim 1 in which said vessel is provided with an opening in the upper part thereof which serves as a vent for said float chamber.

6. The combination with a pneumatic sewage disposal system, of (a) a discharge conduit which is adapted to be maintained at a partial vacuum and through which waste liquid is discharged into the sewage disposal system from a place having an outlet, (b) flow control structure operatively associated with said discharge conduit which opens when liquid starts flowing from the outlet and closes when such flow of liquid stops, (c) said flow control structure comprising a main valve coupled in said discharge conduit at a region thereof downstream from and in communication with the outlet, (d) operating means for opening said main valve responsive to a partial vacuum and for closing said main valve responsive to atmospheric pressure, (e) said discharge conduit including a vessel which is disposed between said main valve and the outlet, said vessel defining a float chamber, (f) a float movable up and down in said float chamber responsive to rise and fall, respectively, of liquid therein, (g) means connecting said main valve operating means to a region of said discharge conduit downstream from said main valve, said last-mentioned means including a first conduit section connected to said last-mentioned region and a second conduit section connected to said main valve operating means and a control valve interposed therebetween, (h) said control valve having a valve member movable between open and closed positions for respectively opening and closing the connection between said first and second conduit sections, (i) said control valve having passageway means which, when said valve member is in its closed position, is in communication with said first conduit section, (j) means including said first conduit section and said passageway means for connecting said main valve operating means to said float chamber when said valve member is in its closed position, (k) means for moving said valve member to its open and closed positions responsive to up and down movement, respectively, of said float, and (l) said flow control structure being so constructed and formed that said float chamber is at a partial vacuum when waste liquid flows from the outlet and at atmospheric pressure when the flow of waste liquid from the outlet stops.

7. Apparatus as set forth in claim 6 in which said flow control structure is so constructed and formed that waste liquid flowing from the outlet to said float chamber functions to block flow of ambient air at atmospheric pressure from the outlet to said float chamber.

8. Apparatus as set forth in claim 6 in which said control valve is so constructed and formed that said passageway means is in communication with both said first and second conduit sections when said valve member is in its open position.

9. Apparatus as set forth in claim 6 which includes an apertured member past which liquid flows from the outlet of the place to said float chamber, said apertured member being so constructed and formed that the rate at which liquid flows in a given interval of time from the outlet to said float chamber will never exceed the rate at which liquid is withdrawn from said float chamber in said given interval of time responsive to partial vacuum in said discharge conduit.

10. Apparatus as set forth in claim 6 in which said control valve is disposed in said float chamber.

11. Apparatus as set forth in claim 6 in which said vessel is provided with an opening in the upper part thereof which serves as a vent for said float chamber.

12. Apparatus as set forth in claim 6 in which said valve member of said control valve comprises a cylindrical-shaped part, said part having a groove defining said passageway means.

*13. A pneumatic liquid disposal system comprising*

*(a) structure for receiving waste liquid from a plurality of sanitary conveniences,*

*(b) conduit means connected to said receiving structure,*

*(c) a vessel,*

*(d) piping for flowing waste liquid by gravity to said vessel from at least one of the sanitary conveniences,*

*(e) means including valve structure connecting said vessel and said conduit means,*

*(f) means for maintaining said receiving structure and conduit means at a partial vacuum.*

*(g) valve operating means for opening and closing said valve structure,*

*(h) said valve operating means including mechanism for opening said valve structure responsive to accumulation of waste liquid in said vessel for flowing waste liquid therefrom through said conduit means, and*

*(i) means for flowing air into said conduit means when flow of waste liquid therethrough is being effected and while said valve structure is open.*

*14. The pneumatic liquid disposal system set forth in claim 13 in which said means for flowing air into said conduit means comprises structure for introducing ambient air into said conduit means.*

*15. The pneumatic liquid disposal system set forth in claim 13 in which said means for flowing air into said conduit means comprises structure for introducing into said conduit means air from the enveloping atmosphere at atmospheric pressure.*

*16. The pneumatic liquid disposal system set forth in claim 13 in which said mechanism of said valve operating means opens said valve structure responsive to accumulation of a definite quantity of waste liquid in said vessel.*

*17. The pneumatic liquid disposal system set forth in claim 13 in which said mechanism of said valve operating means opens said valve structure responsive to an operating condition affected by the accumulation of waste liquid in said vessel.*

*18. The pneumatic liquid disposal system set forth in claim 13 in which said means for flowing air into said conduit means is so constructed and arranged that the air mixes with the waste liquid when flow of waste liquid through said conduit means is being effected and while said valve structure is open.*

*19. The pneumatic liquid disposal system set forth in claim 13 in which said vessel and the part of said connecting means extending therefrom to said valve structure define a region upstream from the latter, said region having at least one opening for ambient air to flow therethrough into said conduit means and constituting said means for flowing air therein.*

*20. The pneumatic liquid disposal system set forth in claim 19 which includes means for adjusting the size of the opening for ambient air.*

*21. A pneumatic liquid disposal system comprising*

*(a) structure for receiving waste liquid,*

*(b) conduit means connected to said receiving structure,*

*(c) a vessel,*

*(d) a sanitary convenience,*

*(e) a connection for discharging waste liquid by gravity from said sanitary convenience to said vessel,*

*(f) means including valve structure connecting said vessel and said conduit means,*

*(g) means for maintaining said receiving structure and conduit means at a partial vacuum,*

*(h) valve operating means for opening and closing said valve structure,*

*(i) said valve operating means including mechanism for initiating opening of said valve structure responsive to accumulation of waste liquid in said vessel for flowing waste liquid therefrom through said conduit means, and*

*(j) means for flowing air into said conduit means when flow of liquid therethrough is being effected and while said valve structure is open.*

References Cited

The following references, cited by the Examiner, are of record in the patented file of this patent or the original patent.

UNITED STATES PATENTS

| | | | |
|---|---|---|---|
| 2,894,268 | 7/1959 | Griebe | 137—236 X |
| 3,115,148 | 12/1963 | Lilgendahl | 137—205 |
| 3,239,849 | 3/1966 | Lilgendahl | 4—77 |
| 3,329,974 | 7/1967 | Belasco et al. | 4—10 X |
| 3,336,767 | 8/1967 | Mackenzie et al. | 137—205 X |
| 3,528,462 | 9/1970 | Quase | 137—236 X |
| 3,538,517 | 11/1970 | Cornish et al. | 4—10 |

HENRY K. ARTIS, Primary Examiner

U.S. Cl. X.R.

137—236; 210—259